United States Patent [19]

Mori et al.

[11] Patent Number: 4,960,669
[45] Date of Patent: Oct. 2, 1990

[54] PROCESS FOR PRODUCING TONER BY GENERATING NON-SOLUBLE CATIONIC INORGANIC PARTICLES IN DISPERSANT MEDIUM

[75] Inventors: Hiromi Mori; Reiko Morimoto, both of Yokohama, Japan

[73] Assignee: Canon Kabushiki Kaisha, Tokyo, Japan

[21] Appl. No.: 279,075

[22] Filed: Dec. 2, 1988

[30] Foreign Application Priority Data

Dec. 8, 1987 [JP] Japan .................................. 62-308531

[51] Int. Cl.$^5$ .......................................... G03G 9/087
[52] U.S. Cl. ....................................... 430/137; 526/91; 526/93; 526/226
[58] Field of Search .................... 430/137; 526/91, 93, 526/201, 226

[56] References Cited

U.S. PATENT DOCUMENTS

| | | | |
|---|---|---|---|
| 4,345,015 | 8/1982 | Hendriksma et al. | 430/137 |
| 4,592,990 | 9/1986 | Takagi | 430/137 |
| 4,804,610 | 2/1989 | Mori et al. | 430/137 |
| 4,816,366 | 3/1989 | Hyosu et al. | 430/137 |

FOREIGN PATENT DOCUMENTS

| | | | |
|---|---|---|---|
| 116044 | 9/1981 | Japan . | |
| 42052 | 3/1982 | Japan . | |
| 59-53856 | 3/1984 | Japan | 430/137 |
| 59-123852 | 7/1984 | Japan | 430/137 |
| 57-856 | 2/1985 | Japan . | |
| 62-266561 | 7/1987 | Japan | 430/137 |
| 2029425 | 3/1980 | United Kingdom | 526/226 |
| 2133571 | 7/1984 | United Kingdom | 430/137 |

*Primary Examiner*—Roland E. Martin
*Attorney, Agent, or Firm*—Fitzpatrick, Cella, Harper & Scinto

[57] ABSTRACT

Toner for developing electrostatic latent images is produced by dispersing an anionic inorganic dispersant in an aqueous medium; generating cationic inorganic particles in the aqueous medium which are hard to dissolve in water so as to produce a dispersant medium of the anionic inorganic dispersant and the cationic inorganic particles; dispersing a monomer composition including at least polymerizable monomer and a cationic material into the dispersant medium and generate particles of the monomer composition; and suspension-polymerizing the monomer composition particles and produce toner.

25 Claims, No Drawings

PROCESS FOR PRODUCING TONER BY GENERATING NON-SOLUBLE CATIONIC INORGANIC PARTICLES IN DISPERSANT MEDIUM

BACKGROUND OF THE INVENTION

Field of the Invention

The present invention relates to a process for producing a toner for developing electrostatic latent images. Toner for electrically or magnetically developing latent images is used in a variety of image forming processes.

A method of electronic photography is disclosed in U.S. Pat. No. 2,297,692 in which photoconductive material is usually employed to form electric latent images on a photosensitive paper in a variety of ways. The thus-formed latent images are developed using a toner to form a toner image which is transferred to a material such as paper when required. Next, this toner image is fixed to the above material by employing heat, pressure, both heat and pressure, or solvent steam so that a copy can be obtained. A variety of types of developing methods have previously been disclosed in which toner is used, as well as different methods of fixing toner images, and a method is selected which is most suitable for the particular image forming process being employed.

Hitherto, the toner used has generally been prepared in such a manner that a coloring material comprising a magnetic body, a color or a pigment is dissolved and mixed into a thermoplastic resin so as to be uniformly diffused therein. The mixture is then pulverized and classified so that a toner having a desired particle size is prepared.

With this preparation method (pulverization), a relatively desirable toner can be prepared, although certain limitations are involved regarding the selection of the material to be used for the toner. For example, once the melted and kneaded substance (the dispersed body of resin and coloring material) has cooled, it must be sufficiently brittle so that it can be pulverized by an economy pulverizer. However the dispersed body must be sufficiently brittle so that, it is easy to form a group of particles having an excessively large particle diameter distribution range at the time of pulverization. A particular problem may arise if particles which have been excessively pulverized are present in this group or if the brittle material could be easily pulverized or powdered even smaller when it is ultimately used in a copying machine or a page printer for the purpose of developing an image.

In the process of pulverization, it is relatively difficult for solid grains such as magnetic powder or coloring material to be uniformly dispersed within the resin. Since the degree to which these solid particles are dispersed may lead to an increase in the degree of fogging or a reduction in the image density, great attention must be paid to the degree of dispersion of the magnetic powder or coloring material. Furthermore, if the coloring material is located on the surface of the powder, it will be crushed and cause a change in the toner developing characteristics.

On the other hand, in order to overcome the problems experienced with such a pulverizing method, some suspension polymerization methods of producing toner were disclosed in Japanese Patent Publications Nos. 36-10231; 43-10799 and 51-14895. In these suspension polymerization methods, monomer compositions obtained by uniformly dissolving or dispersing a polymerizable monomer and a coloring material (where an initiator of polymerization, a crosslinking agent, a charge controller, and other additives may be added if necessary) are immersed in an aqueous phase. The monomer composition is then granulated while being stirred so that it can be polymerized in order to form toner particles.

Such suspension polymerizing methods are preferred since the toner material does not need to be brittle and exposure of the coloring material on the surface of the toner is prevented since there is no pulverizing process. It also exhibits the advantages that adequate fluidity can be obtained since the shape of the obtained toner particles is spherical and the friction electrification is uniform. However, it is a complex undertaking to perform polymerization in a stable suspension system while preventing particles of the monomer composition from aggregating while obtaining uniformly small polymerized particles.

The various characteristics of the toner used in a method of developing latent images need to be controlled to allow the original image to be faithfully reproduced. In this regard, it is critical to control the particle distribution. If an image is formed using a toner having a wide particle distribution, thereby including a large quantity of particles having disordered particle sizes, the toner may be scattered or foggy, or non-uniform images may be generated, leading to deteriorated image sharpness. Furthermore, since the developing characteristics of the toner cannot be made uniform, a problem arises in that the durability of the toner is poor.

The reason that particle size distribution is scattered is that each of the additive materials are uniformly diffused in the monomer compound. In particular, the diffusion of the coloring material, which is usually a necessary component, within the monomer composition greatly affects the particle size distribution. Therefore, a variety of ways to improve its diffusion characteristic have been disclosed. For example, it was disclosed in Japanese Patent Laid-Open No. 54-84731 that the diffusion characteristics of magnetic powder within a polymerizable monomer composition can be improved by bringing the magnetic powder into a lipphilic material. It is also disclosed in Japanese Patent Laid Open No. 56-116044 that the diffusion characteristics of carbon black in a polymerizable monomer composition can be improved by subjecting it to a graft treatment. Although the diffusion characteristics of each of the additives in a monomer composition can be improved by subjecting them to a hydrophilic treatment, a toner having a particle size distribution which is sharp enough for practical use cannot be easily obtained in this way.

On the other hand, a method of making toner particle size distribution sharp by improving the diffusion medium has been disclosed. For example, the method disclosed in Japanese Patent Laid-Open No. 57-42052 controls the particle size by combining a dispersant and an anion type of surface-active agent and Japanese Patent Laid-Open No. 56-156839 controls particle size by adding an aqueous polymerization inhibitor. However, there are certain aspects which remain unsatisfactory in terms of obtaining a polymerized toner having a preferred particle size distribution which exhibits good development characteristics. In particular, since surface-active agents such as an anionic surface-active agent cannot easily be removed by washing with water, such agents tend to remain on the surface of the toner particles, leading to deterioration of the toner developing characteristics.

A method of producing toner by suspension polymerization is disclosed in Japanese Patent Laid-Open No. 59-1238562 (which corresponds to U.S. Pat. No. 4,592,990) in which a monomer system including a cationic polymer and an anion type of dispersant are combined. In this method, the cationic polymer is made present on the surface of the droplets of the monomer composition while the anionic dispersant is present in the interfacial boundary of the anionic dispersant in the manner of an ionic combination by having the cationic polymer contained in the monomer composition, and polymerization is performed in an aqueous medium in which the anionic dispersant is present. As a result, a stable suspension granulation system can be formed to allow the production of a toner having a particle size of approximately 10 to 20 μm with a sharp particle size distribution.

In order to obtain an even more stable suspension granulation system, in Japanese Patent Laid-Open No. 60-57856 an anionic, inorganic dispersant and a cationic, inorganic dispersant are mixed together. This allows the production of toner in which the generation of small suspensions is better prevented with respect to the sole use of an anionic, inorganic dispersant system. In this toner producing method, since the anionic inorganic dispersant and the cationic inorganic dispersant form substantially stable aggregates in the dispersed medium, and it is assumed that the stable aggregates cover the surface of the suspended particles of the polymerizing composition including the cationic substance so as to prevent generation of the particle toner.

There is a preferred method of producing small particle sized toner in a suspension polymerization in which high speed rotation is performed at the time of granulation by a device such as a homogenizer exhibiting high shearing force. In the above-described method of producing toner disclosed by the applicant of the present invention in Japanese Patent Laid-Open No. 60-57856, the stability of the suspended particles with respect to high rotation is insufficient and excessively granulated particles can be generated, resulting in a particle size distribution that is slightly excessive.

As described above, there are a variety of requirements for toner, in particular the ability to provide high grade images, a good quality developing performance, having a small particular size of less than 10 μm and a sharp particle size distribution.

SUMMARY OF THE INVENTION

Accordingly, an object of the present invention is to provide a method of producing a toner for developing electrostatic latent images, wherein the toner can be produced with a particle size which can be easily controlled and the particles of which have small diameters, wherein the generation of small sized particle toner can be prevented, and wherein the particle size distribution can be kept uniform without involving any necessity for classification of the particles.

Another object of the present invention is to provide a method of producing polymerized toner exhibiting excellent developing characteristics.

After extensive studies, it has been discovered that it is very effective for a monomer composition including a cationic material to coexist with an anionic inorganic dispersant by generating, in water, cationic inorganic particles which do not easily dissolve in water so as to make their particle size uniformly small.

An object of the present invention is to provide a process for producing toner for developing electrostatic latent images, comprising:

dispersing anionic inorganic dispersant in an aqueous medium;

generating cationic inorganic particles in the aqueous medium, wherein the cationic inorganic particles are hard to dissolve in water, whereby a dispersant medium with coexisting anionic inorganic dispersant and said cationic inorganic particles is prepared;

dispersing a monomer composition including at least polymerizable monomer and a cationic material into said dispersant medium, whereby particles of said monomer composition are generated; and suspension-polymerizing the thus generated particles in the dispersant medium so that toner is produced.

DETAILED DESCRIPTION OF THE INVENTION

The function of the method of producing toner according to the present invention which has the system described above will now be described in comparison with the conventional method.

When effecting suspension polymerization, toner particles are in general formed by dispersing and polymerizing a polymerizable monomer composition (or a polymerizable monomer system) in a dispersion medium such as water, wherein the polymerizable monomer composition (or polymerizable monomer system) is substantially non-compatible with the dispersion medium. In order to obtain polymerized toner particles with a sharp size distribution, it is critical to stabilize the droplets of particles of the monomer composition particles suspended in the liquid dispersant medium as uniformly-sized particles during the polymerization process.

As described above, a method of improving granulation stability has been published in which a mixed dispersant of an anionic inorganic dispersant and a cationic inorganic dispersant are used to make an aggregate which acts as a dispersant. This prevents the generation of small particles and, as a result of this, toner exhibiting a sharp particle size distribution can be obtained (see the above-described Japanese Patent Laid Open No. 60-57856). However, the inventors of the present invention investigated methods for producing an even more favorable toner having a relatively small particle size relative by utilizing an improved method of stabilizing the droplets. Consequently, the inventors determined that uniform aggregation can be obtained by simultaneously using an anionic inorganic dispersant and cationic inorganic particles which are hard to dissolve in water as a dispersant for stabilizing monomer composition particles including the cationic material, whereby a polymerized toner can be obtained which has relatively smaller particles compared to that obtained by the conventional method and which also has a sharp particle size distribution.

The reason why such excellent stabilization of the droplets can be obtained by the present invention is not clarified as yet, but the inventors assume that when the anionic inorganic dispersant is dispersed in an aqueous medium (intense aggregation) occurs between the anionic inorganic dispersant and the cationic inorganic particles which are hard to dissolve in water generated in the aqueous medium. Since the cationic inorganic particles are produced in water, the particle size thereof can be minimized or limited and therefore the aggregation can be made uniform and small with respect to those obtained by merely dispersing cationic inorganic particles which are difficult to dissolve in water to an aqueous medium. On account of the static electrical attracting force affecting the aggregate formed between the anionic inorganic dispersant and the cationic material, the droplets of the monomer composition including the cationic material are coated at a high density so that the droplets obtain excellent granulation stability. Since the anionic inorganic dispersant having small particles are protected from being in the aqueous medium due to the formation of the above-described aggregates, generation of the droplets of the monomer composition having excessively small particle size can be prevented. As a result of the combination of the above-described effects, the small sized toner particles can be stably obtained and their particle size distribution can be made sharp when the monomer composition is granulated with an apparatus having a high shearing force.

With the producing method according to the present invention, since the particles of the anionic inorganic dispersant and the cationic inorganic particles which are hard to dissolve in water aggregate in the dispersant medium, the dispersing stability of particles having the particle size of substantially 4 μm or less of the monomer composition can be restricted, while the dispersing stability of the droplets having a particle size of substantially 5 to 12 μm, more particularly 5 to 10 μm can be improved. Consequently the toner exhibiting sharp particle size distribution can be produced, in which the number of particles of 4 μm or less is reduced, while the number of particles having the particle size of 16 μm or more is also reduced.

The present invention will now be further in detail described. In the description hereinafter, "part" and "%" representing the quantity ratio are based on weight, unless otherwise specified.

In the method of producing toner according to the present invention, an aqueous medium in which cationic inorganic particles which are hard to dissolve in water and an anionic inorganic dispersant is coexisted is used as the dispersant medium.

The cationic inorganic particles which are hard to dissolve in water comprise inorganic particles displaying positive charge in water and have a solubility of 0.1 g or less with respect to 100 g of 25° C. water. It is preferable for the solubility to be 0.05 g or less with respect to 100 g of water. It is also preferable for the cationic inorganic particles to have a particle size of 5 to 200 μm, which size is capable of forming an aqueous emulsion (or colloidal solution).

As the above-described type of cationic inorganic particles which are hard to be dissolved in water, metal hydroxides such as aluminum (III) hydroxide, iron (III) hydroxide, and chromium (III) hydroxide are preferably used. From the viewpoint of removal or waste water treatment alone, it is preferable to use aluminum (III) hydroxide.

In order to obtain in water the aluminum (III) hydroxide comprising the particles which are hard to dissolve in water, one method is known in which sodium aluminate is decomposed, and another method is known in which aluminum salt is dissolved, either which can be employed in the present invention. The former method can be exemplified by a method in which sodium aluminate solution is neutralized by acid such as carbon dioxide, sulfuric acid, or hydrochloric acid, and a method of aluminum hydroxide which serves as the seed of core is added to sodium aluminate solution so as to perform hydrolysis. On the other hand, as the latter type of method, a method can be exemplified in which, for example, aluminum sulfate or aluminate chloride solution is decomposed by ammonia or sodium carbonate.

The above-described latter method is preferably performed wherein sodium carbonate or sodium hydroxide is reacted with aluminum (III) sulfate so as to generate in water neutral aluminum hydroxide particles which are hard to dissolve in water and sodium sulfate comprising neutral water soluble salt are generated. Since the sodium sulfate is substantially dissociated in water and is neutral, its effect on the anionic inorganic dispersant system can be substantially prevented.

On the other hand, the anionic inorganic dispersant to be used comprises an inorganic dispersant to be negatively charged in water.

As the anionic inorganic dispersant, fine collidal silica particles having BET specific surface area as measured by nitrogen adsorption of 40 to 400 m$^2$/g by the dry process and the wet process are preferably used.

The dry process herein mentioned refers to a process of production of fine silica particles formed by the vapor phase oxidation of silicon halides. For example, it is a process utilizing the pyrolitic oxidation in oxygen-hydrogen flame of silicon tetrachloride gas, and the basic reaction scheme may be represented as follows:

$$SiCl_4 + 2H_2 + O_2 \rightarrow SiO_2 + 4HCl.$$

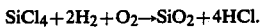

On the other hand, various known processes are applicable as the wet process. For example, there may be included the method according to decomposition of sodium silicate with an acid as generally shown by the following reaction scheme:

$$Na_2O \cdot xSiO_2 + 2HCl + (n-1)H_2O \rightarrow xSiO_2 \cdot nH_2O + 2NaCl$$

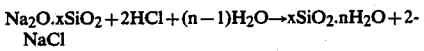

or otherwise according to decomposition of sodium silicate with an ammonium salt or an alkali salt (hereinafter reaction schemes are omitted); the method wherein an alkaline earth metal silicate is formed from sodium silicate and decomposed with an acid, to form silicic acid; the method wherein a sodium silicate solution is converted with an ion-exchange resin into silicic acid; or the method in which silicic acid or silicate is utilized. Fine silica particles (colloidal silica particles) such as Aerosil #200 having BET specific surface area of about 200 m$^2$/g, Aerosil #300 having BET specific surface area of about 300 m$^2$/g, and Aerosil #380 (manufactured by Nihon Aerosil) or Nipsil E-220A (manufactured by Nihon Silica) and Fineseal T-32 (manufactured by Tokuyama Soda) are preferably used.

In the present invention, as the dispersant system, the above-described anionic inorganic dispersant and cationic inorganic particles which are hard to dissolve in water are mixed in a preferred ratio of 100:2 to 100:40 and a further preferred ratio of 100:4 to 100:20. These dispersants are preferably used in the total sum by 1 to 20 parts by weight with respect to 100 parts by weight of the polymerizable monomer composition to be described hereinafter, and in particular, is preferably used at 2 to 15 parts by weight.

The method of producing the above-described dispersant medium system can be exemplified by a method wherein anionic inorganic dispersant is dispersed after the cationic inorganic particles which are hard to dissolve in water have been generated in an aqueous phase medium.

More specifically, the method is exemplified in which sodium hydroxide and aluminum (III) sulfate are substantially equivalently mixed with each other so as to generate in water cationic inorganic particles which are hard to be dissolved in water. The thus generated aluminum hydroxide is then mixed with an anionic inorganic dispersant such as colloidal silica for the purpose of producing a dispersant system. In order to better disperse the anionic inorganic dispersant in water, it is preferable to utilize an alkali (such as the above-described sodium carbonate), and a reagent (such as the above-described aluminum sulfate) for generating cationic particles is added thereto for the purpose of generating the cationic particles. The reason for this is that the dissociation of the anionic group of the anionic inorganic dispersant can be affected by the action of the alkali, causing the dispersing characteristics of this dispersant in aqueous media to be improved.

In the method of producing toner according to the present invention, the polymerizable monomer composition described hereinafter is added to an aqueous dispersant medium (including the above-described cationic inorganic particles which are hard to dissolve in water, such as the aluminum hydroxide and the anionic inorganic dispersant) and granulation may be conducted with a stirrer such as a homomixer or a homogenizer exhibiting high shearing force. Such devices may comprise a turbine which can be rotated at a high speed and a stator. At this time, the stirring speed and time are preferably determined so as to make the monomer composition particles have the desired particle size. The number of revolutions is preferably determined so as to realize a peripheral blade speed of 5 to 25 m/sec. In particular, when toner having a small particle size is desired, the peripheral speed is preferably from 15 to 25 m/sec. Although the time period for granulation is not so limited, it is preferably from 5 to 60 minutes.

As for the temperature of the liquid during the granulation process, it is preferably so as to attain a moment composition viscosity of 50 to 10,000 cps, and preferably 100 to 5000 cps, wherein the particle size of the monomer composition particles can be made from 1 to 20 µm. Since water or aqueous media which are mostly water are used as the dispersed medium, the liquid temperature of the dispersant liquid is preferably 20° to 80° C. (more preferably 40° to 70° C.).

In the suspension polymerization method, the aqueous medium or the dispersant medium is preferably from 200 to 1000 parts by weight with respect to 100 parts by weight of the monomer composition.

After the polymerization reaction of the monomer composition has been completed, the toner particles can be conventionally obtained and treated. For example, after the polymerization reaction has been completed, the dispersant may be dissolved by using alkali, and filtered and washed with water. Then, the thus-generated toner particles may be recovered and dried.

In the method of producing toner according to the present invention, a monomer composition including at least cationic material and polymerizable monomer is dispersed to an aqueous medium containing the above-described type of dispersant system, wherein the monomer composition is substantially non-soluble in the aqueous medium.

In the present invention, nigrosine dye or cationic polar polymers or copolymers are preferably used as the cationic material. More specifically, the preferably used can be exemplified by nigrosine dye such as Bontron N-01, N-02, N-03, N-04, N-05, N-07, N-09, N-10, N-11; Orient Spilit Black AB, SB; Orient Black BW, BS, BY, SO (manufactured by Orient Industries, Ltd.); Spilit Black No. 850, 900, 920, and 980 (manufactured by Sumito Chemical); Nigrosine Base N (manufactured by Arie Chemical & Dye); Nigrosine Base NB (manufactured by Williams); Nigrosine Base GB (Faruvene Fabriken Bayer); and Nigrosine Base NK (Baddish Allyline & Soda); and polymer of a vinyl monomer containing nitrogen such as dimethylaminoethylmethachrylate, and diethylaminoetuylacrylate copolymer, copolymer of styrene and monomer containing nitrogen, and copolymer of styrene, unsaturated acid ester, and monomer containing nitrogen are preferably used. It is preferably to use a cationic polymer or copolymer having a number average molecular weight of 2,000 to 300,000.

The preferable quantity of these cationic materials to be added is, for example, in a case of nigrosine dye, 0.01 to 0.5 parts by weight and more preferably, 0.01 to 0.3 parts by weight. If the quantity of the nigrosine dye of the type described above exceeds 0.5 parts by weight, the polymerization reaction is easily interrupted, making it extremely, difficult to obtain the solid particles and even if they are obtained, the thermal strength of the particles is too weak and so causes blocking at room temperature. On the other hand, if the nigrosine dye is used below 0.01 parts by weight, sufficient toner charge controllability cannot be obtained and the toner cannot be put into practical use as the toner.

The above-described polar polymer or copolymer is preferably added by 0.1 to 50 parts by weight, and further preferably added by 0.1 to 30 parts by weight with respect to 100 parts by weight of the polymerized monomer. The nigosine dye and the polar polymer or copolymer can be used alone and can also be used together without causing any defects.

A vinyl monomer can be exemplified as the polymerizable monomer. It can be exemplified by styrene or styrene derivatives such as o-methyl styrene, m-methylstyrene, p-methylstyrene, p-methoxistyrene, and p-etylstyrene; methacrylate esters (α-methylene aliphatic monocarboxylic acid esters) such as methyl methacrylate, ethyl methacrylate,propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, diethylaminoethyl methacrylate; acrylic esters such as, methyl acrylate, ethyl acrylate, n-butyl acrylate, isobutyl acrylate, propyl acrylate, n-octyl acrylate, dodecyl acrylate, 2-ethyl hexyl acrylate, stearyl acrylate, 2-chrolethyl acrylate and, phenyl acrylate; acrylic acid or methacryl derivative such as acrylonitryl, methacrylonitryl, and acrylic amide. These monomers can be alone or in combinations of two or more. Use of the styrene or styrene derivative alone or combinations with one or more types of monomers improving the developing characteristics and durability of the toner.

It is preferable for the monomer compound to contain a coloring material such as a dye, pigment or magnetic particle. As the dye or pigment, known dyes or pigments such as graft carbon black formed by applying resin to the surface of carbon black or "plain" carbon black can be used in the present invention. Additionally, two or more types of both carbon blacks can be used together. It is preferable for such dye or pigment to be contained by 0.1 to 30 wt % with respect to the polymerizable monomer.

The magnetic particles capable of being used in the present invention comprise a material which can be magnetized in a magnetic field. For example, magnetic particles are exemplified by powder of ferromagnetic metals such as iron, cobalt, and nickel, and powders of alloys or compounds such as magnetite, hematite, and ferrite. Magnetic particles whose primary particle size is 0.05 to 5 μm (more preferably, 0.1 to 1 μm) are preferably used.

The preferable content of this magnetic particles is 10 to 60 wt % with respect to the weight of the toner and more preferably, from 25 to 50 wt %.

These magnetic particles may be treated, if desired, with a treatment agent such as silane coupling agent and titanate coupling agent or a properly reactive type of resin. In this case, the use of the treatment agent by 5 parts by weight or less with respect to 100 parts by weight of the magnetic particles may provide, depending upon the surface area of the magnetic particles and the density of the hydroxyl groups which are present on the surface thereof, a sufficient dispersion characteristic of the magnetic body without causing any defects to the characteristics of the toner.

In order to improve the releasing characteristics at the time of performing heat roll fixation, waxes which are generally used as mold releasing agents such as hydrocarbonic compound or carnauba wax may be mixed in the toner.

The hydrocarbonic compound capable of being used in the present invention can be exemplified by paraffin and polyolefin each having a carbonic chain of $C_6$ or larger. It is preferable to use a hydrocarbonic compound displaying the softening point of 50 to 130° C. More specifically, this hydrocarbonic compound can be exemplified by: Paraffin Wax (manufactured by Nippon Oil Company), Paraffin Wax (Nippon Wax), Microwax (manufactured by Nippon Oil Company), Microcrystan Wax (Nippon Wax), PE-130 (Hext), Mitsui Hiwax 110P (Mitsui Petrochemical Industries, Ltd), Mitsui Hiwax 220P (Mitsui Petrochemical Industries, Ltd), and Mitsui Hiwax 660P (Mitsui Petrochemical Industries, Ltd). It is preferable to use low molecular weight polyethylene, low molecular weight polypropylene, low molecular weight propylene-ethylene copolymer, and paraffin.

The initiator for polymerizing the polymerizable monomer can be exemplified by azobisisobutylonitryl (AIBN), benzoyl peroxide, methylethylketone peroxide, isopropyl peroxycarbonate, cumen hydroperoxide, 2, 4-dichlorobenzoyl peroxide, and lauroyl peroxide. This initiator is generally used from 0.5 to 5 wt % of the weight of the polymerizable monomer.

The polymerization may be performed in the presence of the following crosslinking agents so as to generate crosslinked polymer: divinyl benzene, divinyl naphthalene, divinylether, divinylsulfon, diethylene glycol dimethacrylate, triethylene glycol dimethacrylate, ethylene glycol dimethacrylate, polyethylene glycol dimethacrylate, diethylene glycol diacrylate, triethylene glycol diacrylate, 1, 3-butylene glycol dimethacrylate, 1, 6-hexane glycol dimethacrylate, neopentylglycol dimethacrylate, dipropylene glycol dimethacrylate, polypropylene glycol dimethacrylate, 2, 2'-bis (4-methacryloxydiethoxiphenyl) propane, 2, 2'-bis (4-acryloxydiethoxyphenyl) propane, trimethlolpropane trimethanecrylate, trimethylol propane triacrylate, tetramethylol methane tetracrylate, dibrom neopentyl glycol dimethacrylate, and diaryl phthalate.

If the crosslinking agent is used excessively, toner becomes difficult to melt, so that fixation is deteriorated. If the quantity of crosslinking agent used is not sufficient, the blocking resistance and the durability of the toner deteriorates so that, when heat roll fixation is utilized, it becomes difficult to prevent offset, this phenomenon being such that some of toner cannot be completely fixed to paper, but remains adhered on the surface of the roller, and then it is transferred to the paper. Therefore, the quantity of the crosslinking agent to be used is 0.01 to 15 wt % with respect to the total weight of the monomer, and more preferably, is 0.1 to 10 wt %.

If necessary, flow control additive may be added to the toner. The flow control additive may be mixed with the toner particles. Flow control additives can be exemplified by colloidal silica and fatty metallic salt. A filler such as calcium carbonate and fine silica particles may be mixed in the toner by 0.5 to 20 wt % as the extender. Furthermore, in order to prevent aggregation of the toner particles and to improve flow, flow improving agents such as fine tetrafluoroethylene fluorocarbon polymer powders may be mixed in the toner.

The polymerized toner obtained according to the present invention can be applied to dry electrostatic developing methods such as: a two component type developing method (exemplified, for instance, by cascade, magnetic brush, microtoning, and AC bias type methods; a monocomponent type developing method using magnetic toner (exemplified, for instance, by conductive, insulating and jumping developing methods); powder developing; furbrush method; non-magnetic monocomponent developing in which toner is transferred to the developing portion by holding the toner on the toner carrier due to static electric force; and an electrostatic curtain developing wherein toner is transferred to the developing portion by means of an electrostatic curtain.

The toner obtained due to the present invention is preferably utilized in developing processes in which a sharp particle sized distribution of a small particle sized toner of weighted average diameter of substantially 6 to 8 μm is desired.

As described above, according to the method of producing polymerized toner according to the present invention, an anionic inorganic dispersant aggregate is formed by simultaneously using in an aqueous medium the cationic inorganic particle which is hard to dissolve in water which is generated in aqueous media and an anionic inorganic dispersant, so as to strongly apply the polymerizable monomer composition particles containing the cationic material. Consequently, desired monomer composition particles can be generated. Therefore, polymerized toner which can correspond to a case where small particles are needed, having a sharp particle size distribution, and exhibiting excellent frictional electrification characteristics.

An embodiment of the present invention will now be described. All of the described parts in mixture are parts by weight.

EXAMPLE 1

Hydrophilic colloidal silica (Aerosil #200, Nippon Aerosil) serving as an anionic inorganic dispersant was added at 10 g to 1200 ml of ion exchange water and 1 g of $Na_2CO_3$ was added thereto so as to be heated up to 70° C., and they were dispersed at 10,000 rpm by using a mixer exhibiting high shearing force (TK type of homomixer, manufactured by Tokushu Kika Industries) for 15 minutes. Next, 1.1 g of $Al_2(SO_4)_3$ was added, and they were dispersed at 10,000 rpm for 15 minutes so that aqueous media containing hydrophilic colloidal silica and aluminum (III) hydroxide and serving as a dispersant medium was produced.

| | |
|---|---|
| Styrene | 170 parts |
| 2-ethylhexylacrylate | 30 parts |
| polyethylene glycol dimethacrylate (crosslinking agent, NK Ester 2G, manufactured by Shin Nakamura Chemistry) | 3 parts |
| Parrafin wax (T-550, manufactured by Taisei Industry) | 32 parts |
| Styrene dimethyl aminoethyl methacrylate copolymer (monomer mole ratio 9:1, number average molecular weight Mn = 20,000) | 2 parts |
| Carbon Black (Starling R, manufactured by Cabot) | 10 parts |

The above-described mixture was heated up to 70° C. in a container, and was dissolved and dispersed by using a ultrasonic disperser (10 KHz, 200 W) so that a monomer composition (or mixture) was obtained. Next, 10 parts of dimethyl 2,2'-azobisisobutylate serving as a initiator of polymerization (V-601, manufactured by Wako) was added and dissolved so that a monomer composition was obtained.

The above-described monomer composition was placed in a 2l-flask with the thus-obtained substantially 1200 parts by weight of dispersant medium. They were then stirred at 70° C. and at 10,000 rpm for 60 minutes using a mixer exhibiting a high shearing force (a TK type of homomixer, manufactured by Tokushu Kika Industries) under a nitrogen atmosphere, so that a monomer composition was granulated. Next, a polymerization reaction was conducted at 70° C. for 10 hours with stirred by paddle stirring blades.

The particle size of the thus-obtained toner was measured with Coulter counter (aperture diameter: 100 $\mu$m). This toner displayed a sharp particle size distribution such that its volume average diameter was 7.3 $\mu$m, the ratio of the number of the particles having the particle sizes smaller than 4.0 $\mu$m was 10%, and the ratio of the volume of the particles having the particle sizes larger than 16 $\mu$m was 0%. The thus-obtained toner and iron powder (200/300 mesh) were mixed (toner density: 7 wt %) by a turbula mixer for one minute so as to charge them. Next, the frictional electrification (Tribo value) of this toner with respect to the iron powder was measured by a blow-off method. The frictional electrification was +18 $\mu$c/g.

A developer was produced by mixing the thus-obtained 100 g of polymerized toner with 0.5 g of hydrophobic silica treated with amino modified silicone oil using a Henshell mixer. A two component type developer formed by 5 parts of this developer and 100 parts of ferrite carrier coated with acryl resin was produced. The thus-obtained two component type developer was subjected to a Canon Copying machine NP-3525 for the purpose of image forming (image forming test). A high-quality image without any fogging was obtained which displayed an image density (reflection density) of 1.4.

EXAMPLE 2

A dispersant medium was produced in a manner different from the production of the dispersant medium in Example 1, the difference being in that 20 g of hydrophilic colloidal silica (Aerosil Silica 200), 2 g of $Na_2CO_3$ and 2.2 g of $Al_2(SO_4)_3$ was used. Other factors were materially the same as the Example 1.

| | |
|---|---|
| Styrene | 150 parts |
| n-butyl acrylate | 50 parts |
| polyethylene glycol dimethacrylate (crosslinking agent, NK Ester 4G, manufactured by Shin Nakamura Chemistry) | 2 parts |
| Parrafin wax (155° F., manufactured by Nippon Wax) | 16 parts |
| Styrene dimethyl aminoethyl methacrylate copolymer (monomer mole ratio 9:1, number average molecular weight Mn = 20,000) | 0.2 parts |
| Nigrosine dye (Bontron N-07, manufactured by Orient Chemical Industries) | 0.2 parts |
| Copper phthalocyanine blue | 10 parts |

A polymerized toner was obtained similarly to the Example 1, but the thus-produced monomer composition and the dispersant obtained in the above described manner were used and a mixer exhibiting high shearing force (TK type of homomixer) was used to granulate the toner at 8500 rpm.

The particle size of the thus-obtained toner was measured with Coulter counter (aperture diameter: 100 $\mu$m). This toner displayed a sharp particle size distribution such that its volume average diameter was 11.0 $\mu$m, the ratio of the number of the particles having the particle sizes smaller than 6.35 $\mu$m was 20%, and the ratio of the volume of the particles having the particle sizes larger than 16 $\mu$m was 2%. The frictional electrification (Tribo value) of this toner with respect to the iron powder (200/300 mesh) was measured similarly to the Example 1 and was determined to be +15 $\mu$c/g.

By using the thus-obtained developer, images were formed similarly to Example 1. No fogging was observed in the image, and the image density was 1.4.

EXAMPLE 3

A dispersant medium was produced in a manner different from the production of the dispersant medium in the Example 1, the difference being that 10 g of hydrophilic colloidal silica (Aerozil Silica 200), 2 g of $Na_2CO_3$ was used, and 2.2 g of $Al_2(SO_4)_3$. Other factors were materially the same as Example 1.

| | |
|---|---|
| Styrene | 170 parts |
| 2-ethylhexylacryrate | 30 parts |
| polyethylene glycol dimethacrylate (crosslinking agent, NK Ester 2G) | 3 parts |
| Parrafin wax (T550, manufactured by Taisei Industry) | 32 parts |
| Styrene dimethyl aminoethyl methacrylate copolymer (monomer mole ratio 9:1, number average molecular weight Mn = 20,000) | 2 parts |
| Magnetic particles (BL-200, manufactured by Titan Industry, and treated with 5% of Blenact KR-138S, manufactured by Ajinomoto) | 140 parts |

A polymerized toner was obtained similarly to Example 1, the difference being in that the thus-produced monomer composition and the dispersant obtained in the above described manner were used.

The particle size of the thus-obtained toner was measured with a Coulter counter (aperture diameter: 100 μm). This toner displayed a sharp particle size distribution such that its volume average diameter was 7.8 μm, the ratio of the number of the particles having the particle sizes smaller than 4.0 μm was 11%, and the ratio of the volume of the particles having the particle sizes larger than 16 μm was 1%. The frictional electrification (Tribo value) of this toner with respect to the iron powder (200/300 mesh) was determined by a blow-off method to be +12 μc/g.

A one component type developer was produced by mixing 100 parts of the thus-obtained toner with 0.4 parts of colloidal silica produced by a wet method were mixed with Henshell mixer. The one-component type developer was utilized in a Canon Copying machine NP-3525 for the purpose of image forming. The thus-obtained image displayed high quality without any fogging and displayed an image density (reflection density) of 1.35.

EXAMPLE 4

Styrene slurry containing a magnetic particles treated by a silane coupling agent was produced as follows.

53 kg of ferrous sulfate was dissolved to 50l of water, and they were heated using steam. By maintaining the liquid temperature at 40° C. or higher, a solution having an iron density of 2.4 mol/l was prepared. With air blown in, the Fe (II)/Fe (III) ratio was set to 50. On the other hand, 560 g (156.8 g converted by $SiO_2$) of sodium silicate displaying $SiO_2$ grade 28% was dissolved in 13l of water so as to set the pH to 10. The thus-obtained sodium silicate solution was added and mixed to the ferrous sulfate solution so that ferrous sulfate solution containing silicate component was obtained.

A caustic soda solution of 12 kg caustic soda dissolved in 50l of water was gradually added to the ferrous sulfate solution containing silicate component while being stirred mechanically so as to neutralize the silicate component and make the remaining caustic soda in the iron hydroxide slurry solution 2 g/l. Next, with the temperature of the liquid maintained at 85° C., air was injected at a rate of 37l/minute into the iron hydroxide slurry solution for 5 hours and 30 minutes.

The slurry was then filtered, washed, and dried so that magnetic iron oxide particles containing silicon element was obtained. The rate of the residual silicon element in the thus-obtained magnetic iron oxide was measured by a plasma-spectrophotometry method and determined to be 0.72 wt % basing upon the iron element.

The BET specific surface of the thus-obtained magnetic particles was 8.4 $m^2/g$. These magnetic particles were octahedron particles in which no spherical particle was substantially contained therein and having the average particle size of 0.25 μm as a result of the observation with transmission type electronic microscope.

| Magnetic particles | 100 parts |
| Styrene monomer | 100 parts |
| Stearyl triethoxysilane | 2 parts |

The thus-prepared components were mixed as described above, and they were dispersed and treated by a ultrasonic dispersing machine (10 KHz, 200 W) while being heated to 70° C. so that a styrene slurry containing silane-treated magnetic particles was obtained

| Styrene | 30 parts |
| 2-ethyl hexylacryrate | 30 parts |
| crosslinking agent (NK Ester 4G) | 4 parts |
| Parrafin wax (155° F., manufactured by Nippon Wax) | 32 parts |
| Styrene dimethylaminoethyl methacrylate copolymer (monomer mole ratio 9:1, number average molecular weight Mn = 20,000) | 2 parts |
| Nigrosine dye Bontron (Bontron N-07, manufactured by Orient Chemical Industries) | 0.2 parts |
| Styrene slurry containing a magnetic body treated with the thus-obtained silane coupling agent | 280 parts |

A polymerized toner was obtained similarly to the Example 2, but the difference lies in that the thus-produced monomer composition and the dispersant obtained in the Example 3 were used.

The particle size of the thus-obtained toner was measured with a coal tar counter (aperture diameter: 100 μm). This toner displayed a sharp particle size distribution such that its volume average diameter was 10.8 μm, the ratio of the number of the particles having the particle sizes smaller than 6.35 μm was 19%, and the ratio of the volume of the particles having the particle sizes larger than 16 μm was 2%. The frictional electrification (Tribo Value) of this toner with respect to the iron powder (200/300 mesh) was measured by a blow-off method similarly to Example 1 to be +14 μc/g.

By using the thus-obtained developer, images were formed according to Example 3. The thus-obtained image displayed did not display any fogging, and the image density (reflection density) was 1.45.

EXAMPLE 5

A dispersant medium was produced in a manner different from the production of the dispersant medium in Example 1, the difference being that 0.76 g of NaOH was used instead of 1 g of $Na_2CO_3$. Other factors were materially the same as the Example 1.

The particle size of the thus-obtained toner was measured with Coulter counter (aperture diameter: 100 μm). This toner displayed a sharp particle size distribution such that its volume average diameter was 7.5 μm, the ratio of the number of the particles having the particle sizes smaller than 4.0 μm was 10%, and the ratio of the volume of the particles having the particle sizes larger than 16 μm was 0%.

The frictional electrification (Tribo value) of this toner with respect to the iron powder (200/300 mesh) was measured by a blow-off method similarly to Example 1 to be +17 μc/g.

COMPARISON EXAMPLE 1

A polymerized toner was obtained similarly to the Example 3, but the dispersant which was used was obtained by the addition of 10g hydrophilic colloidal silica (Aerozil 200, manufactured by Nippon Aerozil) serving as anionic inorganic dispersant and 1 g of aluminium oxide C (manufactured by Nippon Aerozil) to 1200 ml of ion exchange water.

The particle size of the thus-obtained toner was measured with Coulter counter (aperture diameter: 100 μm). This toner displayed a great rate of fine toner particles such that its volume average diameter was 7.1 μm, the ratio of the number of the particles having the particle sizes smaller than 4.0 μm was 20%, and the ratio of the volume of the particles having the particle sizes larger than 16 μm was 1%.

COMPARISON EXAMPLE 2

Toner particles were produced by performing suspension polymerization similarly to the Example 3, but 14.4 g of hydrophilic colloidal silica is used.

The particle size of the thus-obtained toner displayed a volume average diameter of 6.9 μm, the ratio of the number of the particles having the particle sizes smaller than 4.0 μm was 20%, and the ratio of the volume of the particles having the particle sizes larger than 16 μm was 1%. The toner produced in the Comparison Example 2 displayed a relatively large amount of fine particles having the particles size of 4.0 μm with respect to that obtained in the Example 3.

COMPARISON EXAMPLE 3

Although disperse-granulation was attempted similarly to the Example 3, only 14.4 g of aluminium oxide was used and stable droplet particles of monomer composition were not obtained.

What is claimed is:

1. A process for producing toner for developing electrostatic latent images, comprising the steps of:
    dispersing an anionic inorganic dispersant in an aqueous phase;
    generating cationic inorganic particles comprising metal hydroxides in said aqueous phase from a water-soluble compound with stirring in order to produce a dispersant medium in which said anionic inorganic dispersant and said cationic inorganic particles coexist, said cationic inorganic particles having a solubility of at most 0.1 g in 100 g of 25° C. water;
    dispersing a monomer composition comprising a polymerizable vinyl monomer and a cationic material into said dispersant medium such that particles of said monomer composition are generated; and
    suspension polymerizing said monomer composition particles in order to produce said toner.

2. The process for producing toner of claim 1, wherein said metal hydroxide particles have a solubility of at most 0.05 g in 100 g of 25° C. water.

3. The process for producing toner of claim 1, wherein said metal hydroxides are selected from the group consisting of aluminum (III) hydroxide, iron (III) hydroxide and chromium (III) hydroxide.

4. The process for producing toner of claim 3, wherein said metal hydroxides have a particle size ranging from 5 to 200 microns.

5. The process for producing toner of claim 3, wherein said metal hydroxide is aluminum (III) hydroxide.

6. The process for producing toner of claim 5, wherein said aluminum (III) hydroxide is prepared by hydrolyzing an aluminum salt or by neutralizing sodium aluminate.

7. The process for producing toner of claim 6, wherein said aluminum salt is aluminum sulfide or aluminum chloride.

8. The process for producing toner of claim 7, wherein said aluminum salt is hydrolyzed using ammonium or sodium carbonate.

9. The process for producing toner of claim 1, wherein said anionic inorganic dispersant comprises silica.

10. The process for producing toner of any of claims 1, 2, 3 or 9, wherein said anionic inorganic dispersant and said cationic inorganic particles are used in a ratio of from 100:2 to 100:40.

11. The process for producing toner of claim 10, wherein said anionic inorganic dispersant and said cationic inorganic particles are used together from 1 to 20 parts by weight of said monomer composition.

12. The process for producing toner of claim 11, wherein said anionic inorganic dispersant and said cationic inorganic particles are used in a ratio of from 100:4 to 100:20.

13. The process for producing toner of claim 12, wherein said anionic inorganic dispersant and said cationic inorganic particles are used together from 2 to 15 parts by weight of said monomer composition.

14. The process for producing toner of any of claims 1, 2, 3, or 4, wherein said monomer composition is dispersed using a blade having a peripheral speed of 5 to 25 m/sec.

15. The process for producing toner of claim 14, wherein said monomer composition is dispersed for 5 to 60 minutes.

16. The process for producing toner of claim 15, wherein said peripheral blade speed is 15 to 25 m/sec.

17. The process for producing toner of claim 14, wherein said monomer composition has a viscosity of 50 to 10,000 cps when it is dispersed.

18. The process for producing toner of claim 17, wherein said dispersant medium has a temperature of 20 to 80° C. when said monomer composition is dispersed.

19. The process for producing toner of claim 18, wherein said monomer composition has a viscosity of 100 to 5000 cps when it is dispersed.

20. The process for producing toner of claim 19, wherein said dispersant medium has a temperature of 40° to 70° C. when said monomer composition is dispersed.

21. The process for producing toner of claim 14, wherein the dispersant medium is from 200 to 1,000 parts by weight per 100 parts by weight of said monomer composition.

22. The process for producing toner of claim 21, wherein said polymerizable monomer is substantially nonsoluble in said aqueous phase.

23. The process for producing toner of claim 21, wherein said monomer composition particles have a size of substantially 5 to 12 microns.

24. The process for producing toner of claim 22, wherein said monomer composition particles have a size of substantially 5 to 10 microns.

25. The process for producing toner of claim 1, wherein said metal hydroxide is generated in said aqueous phase from the water-soluble compound with stirring exhibiting high shearing force.

* * * * *

UNITED STATES PATENT AND TRADEMARK OFFICE
CERTIFICATE OF CORRECTION

PATENT NO. : 4,960,669

DATED : October 2, 1990

INVENTOR(S) : HIROMI MORI, ET AL.

It is certified that error appears in the above-identified patent and that said Letters Patent is hereby corrected as shown below:

ON TITLE PAGE:

[56], "4,592,990 9/1986 Takagi" should read --4,592,990 6/1986 Takagi--;
"57-856 2/1985 Japan" should read --60-57-856 4/1985 Japan--; and
"62-266561 7/1987 Japan" should read --62-266561 11/1987 Japan.

COLUMN 2

Line 44, "lipphilic" should read --lipophilic--.

COLUMN 8

Line 17, "diethylaminoetuylacrylate" should read --diethylaminoethylacrylate;
Line 21, "preferably" should read --preferable--;
Line 47, "p-methoxistyrene" should read --p-methorystyrene--
Line 48, "etylstyrene;" should read --ethylstyrene--;
Line 58, "2-chrolethyl" should read --2-chloroethyl--;
Line 59, "methacryl" should read --methacrylic--;
Line 60, "acrylonitryl" should read --acrylonitrile--; and
Line 60, "methacrylonitryl" should read --methacrylonitrile--

COLUMN 11

Line 62, "Henshell" should read --Henschel--.

UNITED STATES PATENT AND TRADEMARK OFFICE
CERTIFICATE OF CORRECTION

PATENT NO. : 4,960,669

DATED : October 2, 1990

INVENTOR(S) : HIROMI MORI, ET AL.

It is certified that error appears in the above-identified patent and that said Letters Patent is hereby corrected as shown below:

COLUMN 12

Line 55, "2-ethylhexylacryrate" should read --2-ethylhexylacrylate--

COLUMN 13

Line 17, "Henshell" should read --Henschel--.

COLUMN 14

Line 5, "2-ethyl hexylacryrate" should read --2-ethyl hexylacrylate--.

COLUMN 16

Line 24, "3," should read --3--.

Signed and Sealed this

Fifteenth Day of September, 1992

Attest:

DOUGLAS B. COMER

*Attesting Officer*    Acting Commissioner of Patents and Trademarks